United States Patent [19]

Campbell

[11] Patent Number: 5,360,861
[45] Date of Patent: Nov. 1, 1994

[54] POLYESTER-CARBONATE RESIN COMPOSITIONS OF IMPROVED IMPACT-RESISTANCE

[75] Inventor: Richard W. Campbell, Reinholds, Pa.

[73] Assignee: General Electric Company, Pittsfield, Mass.

[21] Appl. No.: 69,908

[22] Filed: May 28, 1993

[51] Int. Cl.$^5$ .............................................. C08K 5/04
[52] U.S. Cl. .................................. 524/494; 524/281; 525/67; 525/148
[58] Field of Search ............... 524/493, 494, 281; 525/67, 148

[56] References Cited

U.S. PATENT DOCUMENTS

| | | |
|---|---|---|
| 4,358,556 | 11/1982 | Van Abeelen .................. 524/494 |
| 4,393,161 | 7/1983 | Van Abeelen . |
| 4,481,331 | 11/1984 | Liu . |
| 4,487,917 | 12/1984 | Mark . |
| 4,621,132 | 11/1986 | Quinn . |
| 4,804,700 | 2/1989 | Allen ........................... 525/394 |
| 5,023,297 | 6/1991 | Boutai ........................ 525/67 |
| 5,116,905 | 5/1992 | Belfoure et a. .............. 525/67 |
| 5,202,374 | 4/1993 | Horn et al. .................. 525/148 |

*Primary Examiner*—Veronica P. Hoke

[57] ABSTRACT

Polyester-carbonate resins blended with a fibrous reinforcing agent, an impact-modifier and optionally a flame-retarding agent are used to mold articles such as structural panels. The articles exhibit improved impact-resistance without significant loss of elastic modulus and fire-retardancy.

9 Claims, No Drawings

POLYESTER-CARBONATE RESIN COMPOSITIONS OF IMPROVED IMPACT-RESISTANCE

BACKGROUND OF THE INVENTION

1. Field of The Invention

The invention relates to thermoplastic molding compositions and more particularly to molding compositions which are formulated from polyester-carbonate resins.

1. Brief Description of the Related Art

Polyester-carbonates [also known as "copoly(ester-carbonates)" or "polyester-polycarbonates"] are a well known class of thermoplastic resin as is their preparation; see for example the descriptions given in U.S. Pat. Nos. 3,169,121 and 4,487,896.

Polyester-carbonate (PEC) resins have been useful thermoplastic molding resins, to mold particular articles of certain physical properties. In general, the polyester-carbonate resins have had limited use for molding some articles, being characterized as yielding molded articles having little resistance to impact when subjected to testing for notched Izod impact strengths.

In the U.S. Pat. No. 4,393,161 to Van Abeelen et al (Jul. 12, 1983) there is a suggestion that by incorporating fibrous reinforcement materials (such as glass fibers) into polycarbonate resins, including polyester-carbonate resins, one can improve certain physical properties of articles molded therefrom. For example, elastic modulus is dramatically improved. However, it is said, that "this always results in a serious deterioration in overall ductility, manifested in poor notched and unnotched impact strength". It is then related that if one adds a conventional impact modifier to the blend, "there is a detrimental effect on stiffness (modulus) strength". To improve impact strength with a polystyrene resin impact-modifier and "almost full retention of the elastic modulus" Van Abeelen et al teaches the use of unsized glass fibers as the reinforcement, and the addition of minor proportions of poly $C_1$–$C_{10}$ alkyl (or phenyl) hydrogen siloxanes "having a substantial content of Si-H bonds". We have confirmed the teachings of Van Abeelen et al., in respect to polycarbonate homopolymers. However, we have now found that particular polyester-carbonate resin based molding blends containing fibrous reinforcement and a so-called "conventional" impact modifier (not necessarily a polystyrene resin), can be used to thermally mold articles exhibiting acceptable elastic modulus and high impact strength (with other desired properties), without addition of the above-described polysiloxane ingredient. The improvement is particularly advantageous in respect to aromatic polyester-carbonate resins having aliphatic diester chain units. This improvement is unexpected, in view of the prior art teachings and further does not detract from flame retardance when flame retardants are also added to the blends.

SUMMARY OF THE INVENTION

The invention comprises a thermoplastic molding composition, which comprises;

(A) a thermoplastic polyester-carbonate resin;

(B) from about 0.1 to 20 percent by weight of the composition of a fibrous reinforcing agent; and (C) an impact-modifying proportion of an impact-modifier.

Preferably, the compositions of the invention are essentially free of hydrogen-Si bonded polysiloxane homopolymer ingredients (although certain polysiloxane-polycarbonate block copolymers may be used as described in more detail hereinafter).

The invention also comprises articles molded from the compositions of the invention, which advantageously exhibit improved impact-resistance without significant lose of elastic modulus.

Preferred compositions and articles of the invention include fire-retarding proportions of fire-retarding agents.

The compositions of the invention are useful to thermoplastically mold articles such as structural panels and the like, which are useful in the fabrication of housings, interior furnishings and the like.

DETAILED DESCRIPTION OF THE PREFERRED EMBODIMENTS OF THE INVENTION

The polyester-carbonates used as ingredient (A) in the compositions of the invention may be prepared by interfacial polymerization technique, well known to those skilled in the art; see for example the U.S. Pat. Nos. 3,169,121 and 4,487,896 which are incorporated herein by reference thereto.

In general, the method of interfacial polymerization comprises the reaction of a dihydric phenol with a carbonyl halide (the carbonate precursor) in the presence of a dicarboxylic acid (ester precursor).

Although the reaction conditions of the preparative processes may vary, several of the preferred processes typically involve dissolving or dispersing the diphenol reactants in aqueous caustic, adding the resulting mixture to a suitable water immiscible solvent medium and contacting the reactants with the carbonate and ester precursors, under controlled pH conditions. The most commonly used water immiscible solvents include methylene chloride, 1,2-dichloroethane, chlorobenzene, toluene, and the like.

Advantageously a catalyst is added to the reaction mixture to promote the reaction. The catalyst employed accelerates the rate of polymerization of the dihydric phenol reactant with the carbonate precursor. Representative catalysts include but are not limited to tertiary amines such as triethylamine, quaternary phosphonium compounds, quaternary ammonium compounds, and the like.

The preferred process for preparing polyester-carbonate resins comprises a phosgenation reaction. The temperature at which the phosgenation reaction proceeds may vary from below 0° C., to above 100° C. The phosgenation reaction preferably proceeds at temperatures of from about room temperatures (25° C.) to 50° C. Since the reaction is exothermic, the rate of phosgene addition may be used to control the reaction temperature. The amount of phosgene required will generally depend upon the amount of the dihydric phenol reactant added.

The dihydric phenols employed are known, and the reactive groups are the two phenolic hydroxyl groups. Some of the dihydric phenols are represented by the general formula:

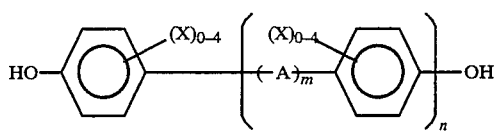

wherein A is a divalent hydrocarbon radical containing from 1 to about 15 carbon atoms; a substituted divalent hydrocarbon radical containing from 1 to about 15 carbon atoms and substituent groups such as halogen; —S—; —S(O)—; —S(O)$_2$—; —O—; or —C(O)—; each X is independently selected from the group consisting of hydrogen, halogen, and a monovalent hydrocarbon radical such as an alkyl group of from 1 to about 8 carbon atoms, an aryl group of from 6–18 carbon atoms, an aralkyl group of from 7 to about 14 carbon atoms, an alkaryl group of from 7 to about 14 carbon atoms, an alkoxy group of from 1 to about 8 carbon atoms, or an aryloxy group of from 6 to 18 carbon atoms; and m is zero or 1 and n is an integer of from 0 to 5.

Typical of some of the dihydric phenols employed are bis-phenols such as (4-hydroxyphenyl)methane, 2,2-bis(4-hydroxyphenyl)propane (also known as bisphenol-A), 2,2-bis(4-hydroxy-3,5-dibromophenyl)propane; dihydric phenol ethers such as bis(4-hydroxyphenyl) ether, bis(3,5-dichloro-4-hydroxyphenyl) ether; dihydroxydiphenyls such as p,p'-dihydroxydiphenyl, 3,3'-dichloro-4,4'-dihydroxydiphenyl; dihydroxyaryl sulfones such as bis(4-hydroxyphenyl) sulfone, bis (3,5-dimethyl-4-hydroxyphenyl) sulfone, dihydroxybenzenes such as resorcinol, hydroquinone, halo- and alkyl-substituted dihydroxybenzenes such as 1,4-dihydroxy-2,5-dichlorobenzene, 1,4-dihydroxy-3-methylbenzene; and dihydroxydiphenyl sulfides and sulfoxides such as bis(4-hydroxyphenyl) sulfide, bis(4-hydroxyphenyl) sulfoxide and bis(3,5-dibromo-4-hydroxyphenyl) sulfoxide. A variety of additional dihydric phenols are available and are disclosed in U.S. Pat. Nos. 2,999,835; 3,028,365 and 3,153,008; all of which are incorporated herein by reference thereto. It is, of course, possible to employ two or more different dihydric phenols or a combination of a dihydric phenol with a glycol.

The carbonate precursor can be either a carbonyl halide, a diarylcarbonate or a bishaloformate. The carbonyl halides include carbonyl bromide, carbonyl chloride, and mixtures thereof. The bishaloformates include the bishaloformates of dihydric phenols such as bischloroformates of 2,2-bis(4-hydroxyphenyl)-propane, 2,2-bis(4-hydroxy-3,5-dichlorophenyl)-propane, hydroquinone, and the like, or bishaloformates of glycols such as bishaloformates of ethylene glycol, and the like. While all of the above carbonate precursors are useful, carbonyl chloride, also known as phosgene, is preferred.

In general, any dicarboxylic acid conventionally used in the preparation of linear polyesters may be utilized as the ester precursor in the preparation of the polyester-carbonate resins used in the instant invention. Generally, the dicarboxylic acids which may be utilized include the aliphatic dicarboxylic acids, the aromatic dicarboxylic acids, and the aliphatic-aromatic dicarboxylic acids. These acids are well known and are disclosed for example in U.S. Pat. No. 3,169,121 which is hereby incorporated herein by reference. Representative of dicarboxylic acids are those represented by the general formula:

HOOC—R$^1$—COOH wherein R$^1$ represents a divalent aliphatic radical such as alkylene, alkylidene, cycloalkylene or substituted alkylene or alkylidene; an aromatic radical such as phenylene, naphthylene, biphenylene, substituted phenylene and the like; a divalent aliphatic-aromatic hydrocarbon radical such as an aralkyl or alkaryl radical; or two or more aromatic groups connected through non-aromatic linkages of the formula:

—E— wherein E is a divalent alkylene or alkylidene group. E may also consist of two or more alkylene or alkylidene groups, connected by a non-alkylene or alkylidene group, connected by a non-alkylene or non-alkylidene group, such as an aromatic linkage, a tertiary amino linkage, an ether linkage, a carbonyl linkage, a silicon-containing linkage, or by a sulfur-containing linkage such as sulfide, sulfoxide, sulfone and the like. In addition, E may be a cycloaliphatic group of five to seven carbon atoms, inclusive, (e.g. cyclopentyl, cyclohexyl), or a cycloalkylidene of five to seven carbon atoms, inclusive, such as cyclohexylidene. E may also be a carbon-free sulfur-containing linkage, such as sulfide, sulfoxide or sulfone; an ether linkage; a carbonyl group; a direct bond; a tertiary nitrogen group; or a silicon-containing linkage such as silane or siloxy. Other groups which E may represent will occur to those skilled in the art.

Some non-limiting examples of aromatic dicarboxylic acids which may be used in preparing the poly(ester-carbonate) include phthalic acid, isophthalic acid, terephthalic acid, homophthalic acid, o-, m-, and p-phenylenediacetic acid, and the polynuclear aromatic acids such as diphenyl dicarboxylic acid, and isomeric naphthalene dicarboxylic acids. The aromatics may be substituted with Y groups. Y may be an inorganic atom such as chlorine, bromine, fluorine and the like; an organic group such as the nitro group; an organic group such as alkyl; or an oxy group such as alkoxy, it being only necessary that Y be inert to and unaffected by the reactants and the reaction conditions. Particularly useful aromatic dicarboxylic acids are those represented by the general formula:

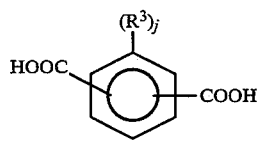

wherein j is a positive whole integer having a value of from 0 to 4 inclusive; and each R$^3$ is independently selected from the group consisting of alkyl radicals, preferably lower alkyl (1 to about 4 carbon atoms).

Most preferred as aromatic dicarboxylic acids are isophthalic acid, terephthalic acid, and mixtures thereof.

Representative of aliphatic dicarboxylic acids within the formula given above wherein R$^1$ is alkylene are butanedioic acid, hexanedioic acid, octanedioic acid, decanedioic acid, dodecanedioic acid and the like. Preferred are dicarboxylic acids having from 4 to 18 carbon atoms, inclusive.

For purposes of the present invention, the aliphatic dicarboxylic acids are preferred. In preferred aliphatic difunctional carboxylic acids, $R^1$ is an alkylene radical such as ethylene, nonylene, decylene, or substituted alkylene.

Mixtures of the dicarboxylic acids may be employed. Therefore, where the term dicarboxylic acid is used herein it is to be understood that this term includes mixtures of two or more dicarboxylic acids.

Rather than utilizing the dicarboxylic acid per se, it is possible, and sometimes most convenient, to employ the reactive derivatives of said acid. Illustrative of these reactive derivatives are the acid halides. The preferred acid halides are the acid dichlorides and the acid dibromides. Thus, for example instead of using isophthalic acid, terephthalic acid or mixtures thereof, it is possible to employ isophthaloyl dichloride, terephthaloyl dichloride, and mixtures thereof.

The proportions of reactants employed to prepare the polyester-carbonate resins used in the invention will vary in accordance with the proposed use of the product composition. Those skilled in the art are aware of useful proportions, as described in the U.S. patents referred to above. In general, the amount of the ester bonds may be from about 5 to about 90 mole percent, relative to the carbonate bonds. For example, 5 moles of bisphenol A reacting completely with 4 moles of isophthaloyl dichloride and I mole of phosgene would give a polyester-carbonate of 80 mole percent ester bonds.

The preferred polyester-carbonates for use in the present invention are those derived from bisphenol A and phosgene and having an intrinsic viscosity of about 0.3 to about 1.5 deciliters per gram in methylene chloride at 25° C.

In the conventional interfacial polymerization methods of preparing polyester-carbonates a molecular weight regulator (a chain stopper) is generally added to the reaction mixture prior to or during the contacting with carbonate and ester precursors. Useful molecular weight regulators include, but are not limited to, monohydric phenols such as phenol, chroman-I, paratertiarybutylphenol, p-cumylphenol and the like. Techniques for the control of molecular weight are well known in the art and are used for controlling the molecular weight of the polyester-carbonate resins used in the present invention.

Those skilled in the art will appreciate that preferred polyester-carbonates described herein may be characterized as containing recurring polycarbonate chain units of the formula:

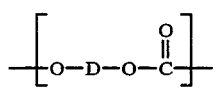
(I)

wherein D is a divalent aromatic radical of the dihydric phenol employed in the resin preparation; and repeating or recurring carboxylic chain units of the formula:-

(II)

wherein D and $R^1$ have the meanings previously ascribed to them.

Fibrous reinforcing agents (B) employed in plastic molding compositions are generally well known and are represented by glass fibers, mineral fibers such as rockwool, carbon fibers and the like. Preferred reinforcing agents are glass fibers such as cut glass filaments (long glass fiber and short glass fiber) rovings and staple fiber.

The filamentous glass that may be used in the embodiments of this invention are well known to those skilled in the art and is widely available from a number of manufacturers. The glass may be untreated or, preferably, treated with silane or titanate coupling agents. For compositions ultimately to be employed for electrical uses, it is preferred to use fibrous glass filaments comprised of lime-aluminum borosilicate glass that is relatively soda free. This is known as "E" glass. However, other glasses are useful where electrical properties are not so important, e.g., the low soda glass known as "C" glass. The filaments are made by known processes, e.g., by steam or air blowing, flame blowing and mechanical pulling. The preferred filaments for plastic reinforcement are made by mechanical pulling.

The length of the glass filaments and whether or not they are bundled into fibers and the fibers bundled in turn to yarns, ropes or rovings, or woven into mats, and the like, are also not critical to the invention. However, in preparing the molding compositions, it is convenient to use the filamentous glass in the form of chopped strands of from about 0.25 cm to about 5 cm long. In articles molded from the compositions, on the other hand, even shorter lengths will be encountered because, during compounding, considerable fragmentation will occur. This is desirable, however, because the best properties are exhibited by thermoplastic injection molded articles in which the filament lengths lie between about 0.0005 to 0.05 cm.

The compositions of the invention include an impact-modifying proportion of an impact modifier (C). Any of the known impact modifiers (other than polysiloxane, homopolymers) for polycarbonates may be used. Representative of such impact-modifiers are selectively hydrogenated linear, sequential or radial teleblock copolymers of a vinyl aromatic compound (A) and (A')$_n$ and an olefinic elastomer (B) of the A—B—A'; A (B—A—B)$_n$A; A (B—A)$_n$B; or B [(A—B$_n$) B]$_4$ type wherein n is an integer of from 1 to 10 inclusive.

The selectively hydrogenated linear block copolymers are well known as are methods of their preparation; see for example Haefele et al, U.S. Pat. No. 3,333,024, which is incorporated herein by reference. Prior to hydrogenation, the end blocks of these copolymers comprise homopolymers or copolymers preferably prepared from alkenyl aromatic hydrocarbons and particularly vinyl aromatic hydrocarbons wherein the aromatic moiety may be either monocyclic or polycyclic. Typical monomers include styrene, alpha methyl styrene, vinyl xylene, ethyl vinyl xylene, vinyl naphthalene, and the like or mixtures thereof. The end blocks (A) and (A'), may be the same or different. They are preferably selected from styrene, α-methyl styrene, vinyl toluene, vinyl xylene, vinyl naphthalene, especially styrene. The center block (B) may be derived from, for example, butadiene, isoprene, 1,3-pentadiene, 2,3,dimethyl butadiene, and the like, and it may have a linear, sequential or teleradial structure.

The ratio of the copolymers and the weight average molecular weights (Mw) can vary broadly although the molecular weight of the center block should be greater than that of the combined terminal blocks. It is preferred to form terminal blocks A and A' having weight average molecular weights of 2,000 to 100,000 and center block B, e.g., a hydrogenated polybutadiene block with a weight average molecular weight of 25,000 to 1,000,000, Still more preferably, the terminal blocks may have weight average molecular weights of 8,000 to 60,000 while the hydrogenated polybutadiene polymer blocks have a weight average molecular weight between 50,000 and 300,000. The terminal blocks will preferably comprise 2 to 60% by weight, or more, preferably, 15 to 40% by weight, of the total block copolymer. The preferred copolymers will be those formed from a copolymer having a hydrogenated/saturated polybutadiene center block wherein 5 to 55%, or more, preferably, 30 to 50% of the butadiene carbon atoms, are vinyl side chains.

The hydrogenated copolymers will have the average unsaturation reduced to less than 20% of the original value. It is preferred to have the unsaturation of the center block B reduced to 10%, or lees, preferably 5% of its original value.

Hydrogenation may be conducted utilizing a variety of hydrogenation catalysts such as nickel on kieselguhr, Raney nickel, copper chromate, molybdenum sulfide and finely divided platinum or other noble metals on a low surface area carrier.

Hydrogenation may be conducted at any desired temperature or pressure, from atmospheric to 300 psig, the usual range being between 100 and 1,000 psig at temperatures from 75° F. to 600° F. for times between 0.1 and 24 hours, preferably from 0.2 to 8 hours.

Hydrogenated block copolymers such as Kraton ® G-6500, Kraton ® G-6521, Kraton ® G-1650 and Kraton ® G-1652 are commercially available from Shell Chemical Company, Polymers. Division. Kraton ® G-1650 and Kraton ® G-1651 are preferred for use in the compositions of the invention. Also usable are the so-called hydrogenated Solprenes of Phillips Petroleum Co., especially the product designated Solprene ®-512.

The radial tel ®block copolymers, of which the Solprenes are typical examples, can be characterized as having at least three polymer branches with each branch of the radial block polymer comprising terminal non-elastomeric segments, e.g. (A) and (A') as defined hereinabove. The branches of the radial block polymer contain a terminal non-elastomeric segment attached to an elastomeric polymer segment, e.g. (B) as defined above. These are described by Marrs, U.S. Pat. No. 3,753,936 and by Zelinski, U.S. Pat. No. 3,281,383, both of which are incorporated herein by reference, and they are selectively hydrogenated by procedures as described above. In any event, the term "selective hydrogenation" is used herein to contemplate polymers in which the elastomeric blocks (B) have been hydrogenated, but the non-elastomeric blocks (A) and (A') have been left unhydrogenated, i.e.; aromatic.

The selectively hydrogenated copolymer impact modifier is used in a proportion of from about 1 to 4 parts by weight (preferably 2 parts by weight for each 100 parts of polyester-carbonate resin.

Preferred as an impact-modifier used in the compositions of the invention are the so-called "ABS" polymers. ABS polymers are defined, for example, in the Modern Plastics Encyclopedia, 1989 edition, page 92, as the family of thermoplastics made from the three monomers acrylonitrile, butadiene and styrene, and more specifically as a mixture (alloy) of styrene-acrylonitrile copolymer with SAN-grafted polybutadiene rubber.

The preferred ABS polymer of high rubber content for use as an impact-modifier is an ABS having greater than 32% rubber content and made by emulsion polymerization, rather than by bulk or suspension polymerization (which are processes frequently used to manufacture commercial ABS). An ABS made by emulsion polymerization is described in U.S. Pat. No. 2,820,773 (1958) which is incorporated herein by reference. ABS resins made by emulsion polymerization and having high rubber content are commercially available, for example the following: Novalar made by Nova Polymers, Inc.: a powdered ABS having about 41% butadiene rubber content, a density of 1.04 and a melt flow index of 4.0; and Blendex 301 made by General Electric Company: a powdered ABS having about 34% polybutadiene rubber content, a specific gravity of 0.99 by ASTM D-792 Method A-1, and a heat deflection temperature of 342° C. at 10 mil deflection and 18 Kg/cm$^2$ (annealed) by ASTM D-648.

Impact-modifying agents for use with the polyester-carbonate based compositions of the invention also include the various polyacrylate resins known in the art. For example, polyacrylates are commercially available from many sources, e.g., Rohm & Haas Chemical Company, Philadelphia, Pa. under the trade designations Acryloid ® KM 330, and 7709 XP; Goodyear Tire & Rubber Company, Akron, Ohio under the trade designation RXL ® 6886; from American Cyanamid Company, Stamford, Conn., under the trade designation Cyanacryl ® 770; from M&T Chemicals Co., Trenton, N.J., under the trade designation Durostrength ® 200; and from Polysar Corporation, Canada, under the trade designation Polysar ® §1006. In general any of the polyalkyl acrylates described by Brinkman et al., U.S. Pat. No. 3,591,659, incorporated herein by reference thereto, can be used, especially those containing units derived from n-butyl acrylate. Preferably, the polyacrylate will comprise a multiple stage polymer having a rubbery first stage and a thermoplastic hard final stage as described in Farnham et al., U.S. Pat. No. 4,096,202 incorporated herein by reference. It has also been found advantageous to add both polyalkyl acrylate and an acrylate-based core-shell polymer such as Acryloid ® KM-330, above-mentioned.

The polyacrylate resin impact modifiers may be added to the compositions of the invention in conventional amounts of from 0.01% to 50% by weight based on the weight of the overall composition and usually in amounts of from 0.01% to 10% by weight on the same basis.

Specific commercially available polymers which can be used as impact modifier component (C) in accordance with the invention include KM653 and like products available from Rohm and Haas Chemical CO. KM653 is an MBS (methacrylate-butadiene-styrene polymer) with about 70-73 wt. percent butadiene in the core, 12 wt. percent methyl methacrylate, and 15 wt. percent styrene. There is a sufficient amount of crosslinker to give at least 96.9 percent insolubles in acetone. Kane Ace ® B-56, available from Kaneka America or Kanegafuchi, is an MBS with about 66 wt. percent butadiene, 20 wt. percent methyl methacrylate, and 14 wt. percent styrene, and a sufficient amount of crosslinker to give at least 92 percent insolubles in acetone. Other MBS polymers include the Metablen ® C Series of impact modifiers (C-201, C-202, C-202C and C-223) commercially available from M&T Chemicals Inc., and the Acryloid ® KM and EXL Series of impact modifiers (KM581, KM436, KM680, EXL2691, EXL2607, and EXL2647) available from Roban & Haas Chemical Co. The MBS rubber and methods for making same, as described above, are discussed in greater detail in U.S.

Pat. No. 4,243,481, U.S. Pat. No. 3,287,443, U.S. Pat. No. 3,509,237, U.S. Pat. No. 3,657,391, U.S. Pat. No. 3,660,535, U.S. Pat. No. 4,180,494, U.S. Pat. No. 4,221,833, U.S. Pat. No. 4,239,863 and U.S. Pat. No. 4,617,345 each of which is hereby incorporated by reference herein.

The preferred core/shell polymers are methyl methacrylate-butadiene-styrene core/shell polymer. The specifically preferred polymer being Kane Ace ® B-56 as described above.

The core/shell polymer is employed in the compositions of the invention in an effective amount sufficient to bring about high impact strength in the room temperature (RT) ⅛-inch Notched Izod test, ASTM D-256. The amount of the shell/core polymer will generally be below about 20% (by weight) and preferably below about 10%.

Another class of known impact modifiers which may be used as an ingredient of the resin compositions of the invention are polyamide-polyether block copolymers which may be represented by the formula:

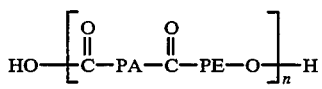

wherein PA represents the polyamide segment, PE represents a polyether segment and n is an integer such that the block copolymer has a weight average molecular weight ($M_w$) of from about 5,000 to about 100,000. Polyamide-polyether block copolymers of the class described above are generally well known and may be prepared for example by the condensation reaction of a prepolyamide and a polyoxyalkylene glycol, by conventional technique; see for example the preparative methods described in U.S. Pat. Nos. 4,208,493; 4,230,838; 4,361,680; and 4,331,786, all of which are incorporated herein by reference thereto. The polyamide-polyether block copolymers so prepared are commercially available and may be wide ranging in their make-up from a wide range of prepolyamides and polyoxyalkylene glycols.

Impact-modifying proportions of the polyamide-polyether block copolymers are generally within the range of from about 0.1 to 10 percent by weight of the resin composition.

Further examples of impact modifiers which may be added to the compositions of the invention are copolymers made from an olefin, e.g., ethylene, propylene, or the like, copolymerized with one or more of a comonomer comprising a $C_1$–$C_6$ alkyl acrylate, e.g., methyl acrylate, ethyl acrylate, hexyl acrylate and the like; a $C_1$–$C_6$ alkyl methacrylate, e.g., methyl methacrylate, ethyl methacrylate, hexyl methacrylate, and the like; acrylic acid; or methacrylic acid. Especially preferred are the well known copolymers of ethylene with an alkyl ester of acrylic acid. These are disclosed in U.S. Pat. No. 2,953,551. Generally, the acrylate or methacrylate portion of the copolymer can range from about 10 to about 30 weight percent. The olefin portion of the copolymer can range from about 70 to about 90 weight percent. The preferred copolymer is an ethylene-ethyl acrylate (EEA) copolymer in which the weight ratio of the ethylene fraction to the ethyl acrylate fraction is about 4.5 to 1. Suitable olefin-acrylate copolymers, as defined above, can be prepared by methods well known to those skilled in the art or can be obtained commercially. For example, Union Carbide's Bakelite ® DPD-6169 ethylene-ethyl acrylate copolymer is advantageous for use in the present invention, when used in a proportion of from about 0.1 to 10 percent by weight of the resin composition.

Linear low density polyethylene resins (LLDPE) are also advantageous impact-modifiers for the present invention and are well known materials, they are available commercially, e.g. from Exxon under the tradename Escorene or from Dow Chemicals under the tradename DOWLEX. Alternatively, they may readily be prepared by state of the art polymerization processes such as those described in U.S. Pat. Nos. 4,354,009, 4,076,698 and U.S. Pat. No. 4,128,607, all incorporated herein by reference. These polymers have a density between about 0.89 and about 0.96 gram/cc, preferably between about 0,915 and 0,945 grams/cc. The linear low density polyethylene polymers are actually copolymers of ethylene and a minor amount, less than 20 mole percent, preferably less than 15 mole percent, of an alpha olefin of 3 to 18 carbon atoms, preferably 3 to 10 carbon atoms, most preferably 4 to 8 carbon atoms. The linear low density polyethylenes are distinguishable from polymers such as high pressure low density polyethylene and high density polyethylene made from Zeigler catalyst systems in that they are substantially free of side chain branching, having a controlled concentration of simple side chain branching as opposed to random branching.

The preferred linear low density polyethylene copolymers are prepared from ethylene and one or more alpha olefins selected from the group consisting of propylene, butene-1, pentene-1,4 methyl pentene-1, hexene-1 and octene-1, most preferably butene-1 and octene-1. Polymers of desired density may be obtained by controlling the co-polymerization ratio of alpha olefin and the formation proportion of the polymer during co-polymerization. The addition of increasing amounts of the co-monomers to the co-polymers results in lowering the density of the co-polymer.

The melt indices of the linear low density polyethylenes useful for the present invention may vary widely. However, when using linear low density polyethylene derived from ethylene and a short chain, e.g. butene-1, monomer, it is preferred that such linear low density polyethylenes have melt indices of at least 5, preferably at least 10, most preferably at least about 20 gm/10 min. With linear low density polyethylenes derived from longer chain, e.g. octene-1, monomers the melt indices of the linear low density polyethylenes may be even lower.

In general, the co-polymerization of linear low density polyethylene can take place in either a gas phase fluidized bed reaction or liquid phase solution process reactor, preferably the former, at pressures ranging from normal to 5000 psi, preferably less than 1000 psi and at temperatures of from 20° C. to 310° C., preferably 30° C. to 115° C. in the presence of a suitable high activity catalysts. Typical catalyst systems comprise transition metal complex catalyst preferably composed of at least one compound of a transition element of groups IVa, Va, and VIa of the periodic chart of the elements Merck Index, 8th Ed., having a halide and/or hydrocarbon group attached to said transition metal and a reducing component such as a metal halide or a compound having metal attached directly to carbon, e.g. metal alkyl. Highly satisfactory catalyst systems have a halide on titanium and wherein the effective organo metallic components are metal alkyl compounds having aluminum as the metal, especially Li Al(hydrocarbon)$_4$. Such systems include for example TiCl$_4$ and LiAl(alkyl)$_4$, VOCl$_3$ and Li(alkyl), MoCl$_3$ and Al(Alkyl)$_3$, TiCl$_4$ and alkyl Mg Br. Catalyst systems such as these as well as other useful catalyst systems are disclosed in U.S. Pat. Nos. 4,354,009, 4,076,698 and 4,128,607.

The linear low density polyethylene resins may be added as impact-modifiers to the compositions of the invention in proportions of from about 0.1 to 15 percent by weight of the total composition.

Impact modifiers which may also be added to the compositions of the invention are organopolysiloxane-polycarbonate block co-polymers. They are highly compatible with the major ingredients of the compositions of the invention. These block copolymers are generally well known resins as are methods of their preparation; see for example preparative descriptions given in the U.S. Pat. Nos. 4,027,072, 4,123,588 and 4,569,970 all of which are incorporated herein by reference thereto. Such resins are also commercially available (LR 3320, General Electric Co, Mount Vernon, Ind.). Representative of polysiloxane-polycarbonate copolymers advantageously employed as impact-modifiers in the compositions of the invention are those prepared by reacting (A) a halogen chain-stopped polydiorgano-siloxane composed of from about 5 to 200 chemically combined diorganosiloxy units consisting essentially of dialkylsiloxy units which are connected to each other by silicon-oxygen-silicon linkages wherein each of the silicon atoms has two organo radicals attached through a carbon-silicon bond, and (B) a dihydric phenol having the formula:

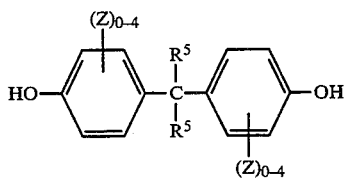

wherein Z is a member selected from the class consisting of hydrogen, lower alkyl radicals and halogen radicals and combinations thereof, and R$^5$ is a member selected from the class consisting of hydrogen, hydrocarbyl and halogenated hydrocarbyl radicals; and phosgenating the purified reaction product until the resulting copolymer achieves a maximum intrinsic viscosity.

The organopolysiloxane-polycarbonate block co-polymers used as impact-modifiers in the compositions of the invention generally comprise about 0.1 to 20 weight percent of the total composition.

The term "halogen" as used herein is embracive of chlorine, bromine, iodine and fluorine.

The term "hydrocarbyl" as used herein means the monovalent moiety obtained upon removal of a hydrogen atom from a parent hydrocarbon. Representative of hydrocarbyl are alkyl of 1 to 20 carbon atoms, inclusive, such as methyl, ethyl, propyl, butyl, pentyl, hexyl, heptyl, octyl, nonyl, undecyl, decyl, dodecyl, tridecyl, tetradecyl, pentadecyl, hexadecyl, heptadecyl, octadecyl, nonodecyl, eicosyl, and isomeric forms thereof; cycloalkyl of 3 to 8 carbon atoms, inclusive, such as cyclopropyl, cyclobutyl, cyclopentyl, cyclohexyl, cycloheptyl, cyclooctyl and the like; alkenyl of 2 to 20 carbon atoms, inclusive, such as vinyl, allyl, butenyl, pentenyl, hexenyl, octenyl, nonenyl, decenyl, undecenyl, dodecenyl, tridecenyl, pentadecenyl, octadecenyl, and isomeric forms thereof; aryl such as phenyl, naphthyl and the like; aralkyl of 7 to 20 carbon atoms such as phenmethyl, phenethyl, phenpentyl, phendecyl, phennonodecyl and isomeric forms thereof.

The term "lower alkyl" is used throughout the specification and claims to mean alkyl as previously defined, having 1 to 4 carbon atoms.

Other impact-modifiers which are advantageously employed as ingredient (c) in the blend compositions of the invention include EPDM rubbers. The term "EPDM" is used in the art to designate rubbery interpolymers of a mixture of monoolefins and a polyene, i.e., homopolymers of conjugated dienes having e.g., 4 to 8 carbon atoms, such as butadiene, isoprene, piperylene and chloroprene; and copolymers of dienes with each other or with styrene, acrylic acid, methacrylic acid, or derivatives thereof (e.g., acrylonitrile, methacrylonitrile, acrylic acid, methacrylic acid, butyl and acrylate and methyl methacrylate), or isobutylene. Preferably, the rubber is selected from among butadiene, butadiene/styrene, butadiene/methyl methacrylate, butadiene/butyl acrylate, ethylene/propylene/idene, polypentanamer and butadiene/acrylonitrile rubber. Preferred types for use in the practice of this invention comprise from about 10 to about 90 mole percent of ethylene, from about 10 to about 90 mole percent of an alpha olefin having 3 to 10 carbon atoms, and from 0.1 to about 10 mole percent of a non-conjugated cyclic or open-chain diene having from 4 to 20 carbon atoms. In the most preferred embodiments, the rubbery interpolymer is derived from ethylene, propylene and a diene selected from 1,4-ethylidenehexadiene, dicyclopentadiene, and especially, 5-ethyldiene-2-norborene.

The thermoplastic compositions of the invention may also be compounded with conventional molding aids such as, for example, antioxidants; antistatic agents; ultraviolet radiation absorbers such as the benzophenones, benzotriazoles, and the like; hydrolytic stabilizers such as the epoxides disclosed in U.S. Pats. Nos. 3,489,716, 4,138,379 and 3,839,247, all of which are incorporated herein by reference; color stabilizers such as the organophosphites; thermal stabilizers such as phosphite; mold release agents and the like.

Additional embodiments of the invention include thermoplastic molding compositions containing minor proportions (less than 50 percent by weight) of polycarbonate homopolymers.

Polycarbonate homopolymer resins and their method of preparation by interfacial polymerization are well known; see for example the details provided in the U.S. Pat. Nos. 3,028,365; 3,334,154; 3,275,601; 3,915,926; 3,030,331; 3,169,121; 3,027,814; and 4,188,314, all of which are incorporated herein by reference thereto. In general, the method is as described above for preparing polyester-carbonates, but in the absence of an ester precursor.

Also included within the blends of the present invention is the presence as an additive, of minor proportions of high molecular weight thermoplastic randomly branched polycarbonates and polyester-carbonates. These randomly branched polymers are prepared by co-reacting a polyfunctional organic compound with the aforedescribed dihydric phenols, carbonate and/or ester precursors. The poly-functional organic compounds useful in making the branched polycarbonates are set forth in U.S. Pat. Nos. 3,635,895 and 4,001,184 which are incorporated herein by reference. These polyfunctional compounds are generally aromatic and contain at least three functional groups which are carboxyl, carboxylic anhydrides, phenols, haloformyls or mixtures thereof. Some nonlimiting examples of these polyfunctional aromatic compounds include 1,1,1-tri(4-hydroxyphenyl) ethane, 1,3,5-trihydroxybenzene, trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic dianhydride, and the like. The preferred polyfunctional aromatic compounds are 1,1,1-tri(4-hydroxyphenyl) ethane, trimellitic, anhydride or trimellitic acid or their haloformyl derivatives. Also included herein are blends of a linear polycarbonate and a branched polycarbonate.

Preferred embodiment compositions of the invention include as an additive ingredient (D) flame retarding agents. In general, the presence of impact-modifiers in polycarbonate based molding compositions is degradative to the action of fire retardants. However, in the compositions of the present invention, reductions in flame-retardance due to presence of the impact-modifier is unexpectedly not significant.

Some particularly useful flame retardants are the alkali and alkaline earth metal salts of sulfonic acids. These types of flame retardants are disclosed in U.S. Pats. Nos. 3,933,734; 3,931,100; 3,978,024; 3,948,851; 3,926,980; 3,919,167; 3,909,490; 3,953,396; 3,953,300; 3,917,559; 3,951,910 and 3,940,366, all of which are hereby incorporated herein by reference.

Preferred as a flame retarding additive for use in the compositions of the invention are the halogenated polycarbonate resins such as tetrabromobisphenol polycarbonate.

The tetrabromobisphenol polycarbonate can be any of the homopolycarbonates made from tetrabromobisphenol A and phosgene or the copolycarbonates made using partly tetrabromobisphenol A and partly bisphenol A. The homopolycarbonates are available for example from Great Lakes Chemical Corp. as BC-52 and BC-58; BC-52 is an oligomer of tetrabromobisphenol A polycarbonate with phenoxy end groups on the chain; BC-58 is similar but with 2,4,6-tribromophenoxy end groups on the chain. The copolymers of tetrabromobisphenol A and bisphenol A are described and their preparation given by Womback, U. S. Pat. No. 3,915,926, incorporated herein by reference thereto. The preferred tetrabromobisphenol A polycarbonate is one having about 50% tetrabromobisphenol A and 50% bisphenol A units on a molar basis.

Flame-retarding component (D) may also be a flame retardant sulfonate salt such as those described in U.S. Pat. No. 3,775,367 or the aromatic sulfonate salts such as those described in U.S. Pat. Nos. 3,940,366, 3,933,734, 3,948,851, 3,926,908, and 3,909,490 incorporated herein by reference. The preferred salts are the alkali metal salts.

The perfluoroalkylsulfonate salt of an alkali metal can be any of those disclosed by Nouvertne, U. S. Pat. No. 3,775,367 (1973) incorporated herein by reference. Thus for example they can be the sodium or potassium salts of trifluoromethanesulfonic acid, nonafluorobutane-1-sulfonic acid, heptadecafluorooctanesulfonic acid, or the like. The preferred salt of this class is potassium nonafluorobutane-1-sulfonate.

Flame-retarding proportions of flame retardants vary in accordance with the specific flame retardant. In general, a flame-retarding proportion comprises from 0.01 to about 20 weight percent of the total composition.

The production of the compositions of the invention is done by any of the blending operations known for the blending of thermoplastics, for example blending in a kneading machine such as a Banbury mixer or an extruder. The sequence of addition is not critical but all components should be thoroughly blended together. Blending can be done continuously or batchwise. Melt blending can also be employed.

The following examples describe the manner and process of making and using the invention and set forth the best mode contemplated by the inventor for carrying out the invention but are not to be construed as limiting the scope of the invention. All parts are by weight unless otherwise stated. The term "phr" as used below means parts by hundred weight of resin. Test results are in accordance with the following test methods.

Kasha Index (KI)

A measure of melt viscosity, by the method described in U.S. Pat. No. 4,735,978 (incorporated herein by reference thereto); results reported in centiseconds, measured at 6 min and at a temperature of 300° C.

Flexural Yield and Modulus (FY and FM)

ASTM Test Method D-790.

Notched and Un-Notched Izod Impact Strength

ASTM Test Method D-256; all specimens were 100% ductile at failure, unless otherwise noted.

Specific Gravity (SP G)

Determined by ASTM test method D-792.

Dynatup Impact

Dynatup impact measurements were made in a Dynatup autoloader machine using 125 mil thick 10.16 cm discs. The tup impact velocity was 12.2 ft/sec giving an impact energy of 148 ft-lb. The average energy to maximum load of three measurements is reported. All specimens were 100% ductile at failure, unless otherwise noted.

Flammability (UL-94)

The resin is injection molded at about 600° C. into test bars of about 12.7 cm. by 1.27 cm. by 1.175 mm. in thickness. These test bars are subjected to the test procedure set forth in underwriters' Laboratories, Inc. Bulletin UL-94, Burning Test for Classified Materials. The test results are reported as V-0, V-1 or V-2 ratings based on the results of 5 test bar specimens. The criteria for each V (for vertical) rating per UL-94 is briefly as follows: "V-0": Average flaming and/or glowing after removal of the igniting flame shall not exceed 5 seconds and none of the specimens shall drip flaming particles which ignite absorbent cotton. "V-1": Average flaming and/or glowing after removal of igniting flame shall not exceed 25 seconds and the glowing does not travel vertically for more than 125 mm of the specimen after flaming ceases and glowing is incapable of igniting absorbent cotton. "V-2": Average flaming and/or glowing after removal of igniting flame shall not exceed 25 seconds and the specimens drip flaming particles which ignite absorbent cotton. Further, UL-94 requires that all test bars in each test group must meet the V-type rating to achieve the particular V classification. Otherwise, the 5 test bars receive the rating of the worst single bar. For example, if one bar is classified as V-2 and the other four are classified as V-0, then the rating for all 5 bars is V-2.

A rating of "HB" is given when a 12.7 cm long test piece held horizontally exhibits a burning rate of 7.6 cm/minute.

Average flame out times (avg. FOT) are given in seconds.

EXAMPLES 1–8

A plurality of different compositions of the invention were prepared by blending together various proportions of a copolyester-carbonate resin [Lexan ® SP, a polyester-carbonate (PEC) based on hisphenol A (BPA) and 9 mole percent of dodecanedioic acid (DDDA)], which displays a glass transition temperature (Tg) of 127° C.; General Electric Co., Mount Vernon, Ind.) and various proportions of an MBS (B-56) impact modifier (KANE ACE ® B56 a core-shell copolymer of about 66% butadiene, 20% methyl methacrylate, about 14% styrene, and a sufficient amount of crosslinker to give at least 92% insolubles in acetone; made by Kanegafuchi, Japan). The compositions also contained varying proportions of a flame-retarding additive TB-50 (tetrabromobisphenol-A/bisphenol-A; 50:50 oligomeric copolycarbonate, a flame retardant polymeric additive made by General Electric Co., Mount Vernon, Ind.), 9.0 percent by weight of chopped glass fibers (OCF 415 BB; Owens-Corning Fiberglass Co.; E glass, 3,175 mm), 1.5 phr of drip inhibitor concentrate (20% polytetrafluoroethylene mixed with 80% by weight of polycarbonate resin), 0.5 phr of potassium diphenyl sulfone-3-sulfonate fire retardant and 0.7 phr of polyalphaolefin mold release additive (Emery 3004, Emery Chemical Company).

As a control No. 1, one blend was prepared without impact-modifier ingredient.

As a control No. 2, a blend was prepared replacing the PEC resin with Lexan ® 105, a homopolymer polycarbonate resin (PC) prepared by phosgenation of bisphenol-A.

The blend was then fed to an extruder at a temperature of about 340° C. to extrude the blend into strands. The strands were chopped into pellets and injection molded into test samples measuring 6.35 cm×1.27 cm×0.317 cm. The samples were tested for physical properties. The composition formulations together with test results are set forth in the Table I, below.

TABLE I

| Example No. | 1 | 2 | 3 | 4 | 5 |
|---|---|---|---|---|---|
| Ingredients (% by wgt.) | | | | | |
| PEC | 84.5 | 84.0 | 83.5 | 83.0 | 83.0 |
| Glass | 9.0 | 9.0 | 9.0 | 9.0 | 9.0 |
| B-56 Impact Modifier | 0.5 | 1.0 | 0.5 | 1.0 | 2.0 |
| TB-50 Fire Retardant | 6.0 | 6.0 | 7.0 | 7.0 | 6.0 |
| Test Results | | | | | |
| Specific Gravity | 1.26 | 1.25 | 1.25 | 1.26 | 1.25 |
| UL94 | | | | | |
| V Rating | VO | VO | VO | VO | VO |
| Avg. FOT (seconds) | 1.87 | 2.34 | 1.59 | 2.08 | 3.7 |
| FM (MPa) | 3125 | 3173 | 3247 | 3166 | 3206 |
| FY (MPa) | 104 | 99 | 101 | 99 | 96 |
| KI (centiseconds) | 5180 | 4650 | 4950 | 4510 | 5480 |
| Notched Izod (J/M) (3.175 mm)* | 219[50] | 278 | 171[40] | 262 | 299 |
| Unnotched Izod (J/M) (3.175 mm)* | 598 | 1462[20] | 1180[20] | 1388[20] | 20816[40] |

| Example No. | 6 | 7 | 8 | Control No. 1 | Control No. 2 |
|---|---|---|---|---|---|
| Ingredients (% by wgt.) | | | | | |
| PEC | 82.0 | 79.0 | 76.0 | 85.0 | — |
| Lexan ® 105 | — | — | — | — | 85.0 |
| Glass | 9.0 | 9.0 | 9.0 | 9.0 | 9.0 |
| B-56 Impact Mod. | 3.0 | 6.0 | 9.0 | — | — |
| TB-50 Fire Retardant | 6.0 | 6.0 | 6.0 | 6.0 | 6.0 |
| Test Results | | | | | |
| UL94 (60 mil specimens) | | | | | |
| V Rating | VO | V1 | HB | VO | VO |
| Avg. FOT (seconds) | 1.87 | 2.34 | 1.59 | 2.08 | 3.7 |
| Specific Gravity | 1.253 | 1.244 | 1.235 | 1.254 | 1.269 |
| FM (MPa) | — | — | — | 3367 | 3471 |
| FY (MPa) | — | — | — | 104 | 114 |
| KI (centiseconds) | 3450 | 3990 | 4030 | 6190 | 8940 |
| Notched Izod (J/M) 3.175 mm* | 160 | 197 | 208 | 107[0] | 91[0] |
| Unnotched Izod (J/M) 3.175 mm* | 657[20] | 646[0] | 582[0] | 1035[0] | 822[0] |
| DYNATUP IMPACT (J) | 28 | 27 | 26 | 28 | — |

FOOTNOTE:
*Figures in parenthesis indicate percentage of specimens ductile at failure.

EXAMPLES 9–13

The procedure of Examples 1–8, supra., was repeated, except that the impact-modifier B-56 as used therein was replaced with various proportions of other impact-modifiers. The modifiers used, their proportions and the test results are set forth in the TABLE II below.

TABLE II

| Example No. | 9 | 10 | 11 | 12 | 13 | Control |
|---|---|---|---|---|---|---|
| Ingredients (% by wgt.) | | | | | | |
| PEC | 84.0 | 83.0 | 82.0 | 79.0 | 84.0 | 85.0 |
| Glass | 9.0 | 9.0 | 9.0 | 9.0 | 9.0 | 9.0 |
| EEA* | | | | | 1.0 | |
| LR3320** | | | 3.0 | 6.0 | | |
| LPX-15*** | 1.0 | 2.0 | | | | |
| TB-50 fire retardant | 6.0 | 6.0 | 6.0 | 6.0 | 6.0 | 6.0 |
| Test Results UL94 (60 mil specimens) | | | | | | |
| V Rating | VI | HB | VI | VO | VI | VO |
| Avg. FOT (seconds) | 8.1 | 8.6 | — | — | 5.3 | 2.9 |
| Specific Gravity | 1.250 | 1.244 | 1.256 | 1.231 | 1.251 | 1.254 |
| FM (MPa) | 2707 | 2707 | — | — | 2733 | 3367 |
| FY (MPa) | 85 | 87 | — | — | 90 | 104 |
| KI (centiseconds) | 6440 | 6370 | 3780 | 4020 | 5760 | 6190 |
| NOTCHED IZOD (J/M) 3.175 mm* | 299 | 320 | 181 | 187 | 294 | 107(o) |
| UNNOTCHED IZOD (J/M) 3.175 mm* | 2445 | 2813 | 630(o) | 582(o) | 2487(80) | 1035(o) |
| DYNATUP IMPACT (J) | 28 | 26 | 28 | 29 | 28 | 28 |

FOOTNOTE:
*Figures in parenthesis indicate percentage of specimens ductile at failure.
*EEA is an ethylene-ethyl acrylate copolymer; Bakelite ® DPD-6169, Union Carbide Corporation, Danbury, Ct.
**LR 3320 is a polysiloxane-polycarbonate block copolymer prepared as described in U.S. Pat. No. 4,027,072 incorporated herein by reference thereto (LR 3320 Resin; General Electric Company, Mt. Vernon, Inc.).
***LPX-15 is linear low density polyethylene copolymer of ethylene and butene-1, melt index of 20 gm/10 min., Exxon Corp.

What is claimed is:

1. A thermoplastic molding composition which consists essentially of;

(A) a thermoplastic polyester-carbonate resin having recurring carbonate chain units of the formula:

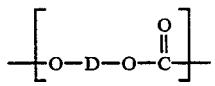

wherein D is a divalent aromatic radical of the formula:

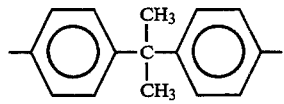

interrupted by recurring carboxylic chain units of the formula:

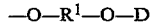

wherein D is as defined above and $R^1$ is a divalent alkylene radical having 2 to 16 carbon atoms, inclusive;
the proportion of carbonate chain units to carboxylic chain units being within the range of from 10 to 95 mole percent;

(B) from about 0.01 to 20 percent by weight of the composition of a fibrous glass reinforcing agent;

(C) an impact-modifying proportion of an impact-modifier selected from the group consisting of a methacrylate-butadiene-styrene copolymer, a linear low density polyethylene resin, an ethylene-ethyl acrylate copolymer, and a polysiloxane-polycarbonate block copolymer, prepared by reacting (1) a halogen chain-stopped polydiorganosiloxane composed of from about 5 to 200 chemically combined dialkylsiloxy units consisting essentially of diorganosiloxy units which are connected to each other by silicon-oxygen-silicon linkages wherein each of the silicon atoms has two organo radicals attached through a carbon-silicon bond, and (2) a dihydric phenol having the formula:

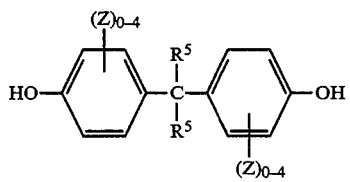

where Z is a member selected from the class consisting of hydrogen, lower alkyl radicals and halogen radicals and combinations thereof, and $R^5$ is a member selected from the class consisting of hydrogen, hydrocarbon and halogenated hydrocarbon radicals; and phosgenating the reaction product until the resulting copolymer achieves a maximum intrinsic viscosity; and (D) a fire-retarding proportion of a fire-retardant.

2. The composition of claim 1 wherein R' represents dodecylene.

3. The composition of claim 2 wherein the fire retardant is a copolycarbonate oligomer prepared by phosgenation of equal molar proportions of bisphenol-A and tetrabromobisphenol-A.

4. An article thermoplastically molded from the composition of claim 1.

5. The composition of claim 1 wherein the impact-modifier is a methacrylate-butadiene-styrene copolymer.

6. The composition of claim 1 wherein the impact-modifier is a linear low density polyethylene resin.

7. The composition of claim 1 wherein the impact-modifier is an ethylene-ethyl acrylate copolymer.

8. The composition of claim 1 wherein the impact-modifier is a polysiloxane-polycarbonate block copolymer.

9. The composition of claim 8 wherein the polysiloxane-polycarbonate block copolymer is prepared by reacting (A) a halogen chain-stopped polydiorganosiloxane composed of from about 5 to 200 chemically combined dialkylsiloxy units consisting essentially of diorganosiloxy units which are connected to each other by silicon-oxygen-silicon linkages wherein each of the silicon atoms has two organo radicals attached through a carbon-silicon bond, and (B) a dihydric phenol having the formula:

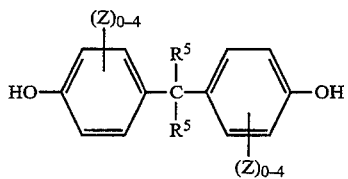

where Z is a member selected from the class consisting of hydrogen, lower alkyl radicals and halogen radicals and combinations thereof, and $R^5$ is a member selected from the class consisting of hydrogen, hydrocarbon and halogenated hydrocarbon radicals; and phosgenating the reaction product until the resulting copolymer achieves a maximum intrinsic viscosity.

* * * * *